(12) United States Patent
Koumura

(10) Patent No.: US 7,540,515 B2
(45) Date of Patent: Jun. 2, 2009

(54) STRUT SUSPENSION

(75) Inventor: Shingo Koumura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 425 days.

(21) Appl. No.: 11/217,453

(22) Filed: Sep. 2, 2005

(65) Prior Publication Data

US 2006/0076751 A1 Apr. 13, 2006

(30) Foreign Application Priority Data

Sep. 27, 2004 (JP) ............................. 2004-279346

(51) Int. Cl.
*B60G 15/00* (2006.01)
(52) U.S. Cl. .................. 280/124.154; 280/124.179; 280/93.512; 267/221
(58) Field of Classification Search ..............................
280/124.145–124.147, 124.154–124.155,
280/124.179, 93.512, 86.758, 86.751, 86.752;
267/221
See application file for complete search history.

(56) References Cited

U.S. PATENT DOCUMENTS

| 3,573,880 | A | * | 4/1971 | Sakai ................... 280/124.146 |
| 4,531,759 | A | | 7/1985 | Rezanka et al. |
| 5,048,859 | A | * | 9/1991 | Nishikuma et al. .......... 180/253 |
| 5,947,459 | A | * | 9/1999 | Ducloux et al. ............. 267/221 |
| 6,027,130 | A | * | 2/2000 | Kawabe et al. ........ 280/124.135 |
| 6,082,720 | A | * | 7/2000 | Ducloux et al. ............. 267/221 |
| 6,199,882 | B1 | * | 3/2001 | Imaizumi et al. ...... 280/124.146 |
| 2004/0256830 | A1 | * | 12/2004 | Omi et al. ............. 280/124.147 |

FOREIGN PATENT DOCUMENTS

| DE | 601 09 094 T2 | 4/2006 |
| JP | A 58-47614 | 3/1983 |
| JP | A-10-109510 | 4/1998 |
| JP | A 11-48728 | 2/1999 |
| JP | A 11-48729 | 2/1999 |
| JP | A 2002-283820 | 10/2002 |
| WO | WO 01/56819 A1 | 8/2001 |
| WO | WO 02/40299 A1 | 5/2002 |

* cited by examiner

*Primary Examiner*—John Q. Nguyen
*Assistant Examiner*—Drew J. Brown
(74) *Attorney, Agent, or Firm*—Oliff & Berridge, PLC

(57) ABSTRACT

A strut suspension includes a strut whose upper end is supported by an automobile body and whose lower end is supported by a wheel side member, an upper side spring seat, a lower side spring seat fixed to the strut, and a coil spring arranged between the upper side spring seat and the lower side spring seat so as to surround the strut. In a vehicle standard state where a rudder angle provides a neutral rudder position and a vehicle is stopped. A coil center axis of the coil spring and a kingpin shaft cross each other. The coil center axis of the coil spring and a strut shaft form an angle larger than zero when being seen at a vehicle side view.

7 Claims, 6 Drawing Sheets

STRUT SUSPENSION

BACKGROUND OF THE INVENTION

1. Field of the Invention

The present invention generally relates to strut suspensions and more particularly, to a strut suspension having a strut whose upper end is supported by an automobile body and whose lower end is supported by a wheel side member, an upper side spring seat, a lower side spring seat fixed to the strut, and a coil spring arranged between the upper side spring seat and the lower side spring seat so as to surround the strut.

2. Description of the Related Art

A structure where a coil center axis (axial line) of a coil spring and a kingpin axis are twisted is known, compared to a normal strut suspension structure where the coil center axis of the coil spring and the kingpin shaft cross each other. See Japan Laid-Open Patent Application Publication No. 11-48728, for example. In such a suspension structure, for example, it is possible to improve responsiveness, stability or alignment of an automobile by creating a twisting relation whereby a moment in a toe-in direction is generated around the kingpin shaft.

However in the above-mentioned strut suspension, a moment is generated around the kingpin shaft even in a vehicle standard state, namely a vehicle stopping state wherein a rudder angle provides a neutral rubber position. Hence, if there is a difference of the moments between right and left sides, a bad influence may be made on a moving vehicle. In other words, if a difference of the twisting relation is generated between the right and left sides due to the influence of dispersion, for example, then different moments are always generated around left and right kingpin shafts so that a vehicle deflection (vehicle change in direction) may be generated. Hence, the stability or alignment of the automobile may be degraded.

SUMMARY OF THE INVENTION

Accordingly, it is a general object of the present invention to provide a novel and useful strut suspension in which one or more of the problems described above are eliminated.

Another and more specific object of the present invention is to provide a strut suspension whereby a primary factor causing automobile deflection which is a disadvantage of a structure where a coil center axis and a kingpin shaft are in a twisted state, is overcome while an advantage of the structure where the coil center axis and the kingpin shaft are in the twisted state is maintained.

The above-object of the present invention is achieved by a strut suspension, including:

a strut whose upper end is supported by an automobile body and whose lower end is supported by a wheel side member;

an upper side spring seat;

a lower side spring seat fixed to the strut, and a coil spring arranged between the upper side spring seat and the lower side spring seat so as to surround the strut;

wherein, in a vehicle standard state where a rudder angle provides a neutral rudder position and a vehicle is stopped, a coil center axis of the coil spring and a kingpin shaft cross each other, and the coil center axis of the coil spring and a strut shaft form an angle larger than zero when being seen at a vehicle side view.

The above-object of the present invention is achieved by a strut suspension, including:

a strut whose upper end is supported by an automobile body and whose lower end is supported by a wheel side member;

an upper side spring seat supported via a bearing so as to rotate against the automobile body;

a lower side spring seat fixed to the strut; and a coil spring arranged between the upper side spring seat and the lower side spring seat so as to surround the strut;

wherein, in a vehicle standard state where a rudder angle provides a neutral rudder position and a vehicle is stopped, a coil center axis of the coil spring and a kingpin shaft cross each other, and a bearing rotational shaft is inclined at a non-right angle against a bearing surface of the upper side spring seat or the kingpin shaft is inclined at a non-right angle against a bearing surface of the lower side spring seat, when being seen at a vehicle side view.

The above-object of the present invention is achieved by a strut suspension, including:

a strut whose upper end is supported by an automobile body and whose lower end is supported by a wheel side member;

an upper side spring seat supported via a bearing so as to rotate against the automobile body;

a lower side spring seat fixed to the strut; and a coil spring arranged between the upper side spring seat and the lower side spring seat so as to surround the strut;

wherein, in a vehicle standard state where a rudder angle provides a neutral rudder position and a vehicle is stopped, a coil center axis of the coil spring and a kingpin shaft cross each other, and a bearing rotational shaft is inclined at a non-right angle against a bearing surface of the upper side spring seat or the kingpin shaft is inclined at a non-right angle against a bearing surface of the lower side spring seat, so that the inclination directions are opposite to each other, when being seen at a vehicle side view.

The above-object of the present invention is achieved by a strut suspension, including:

a coil spring;

wherein a coil center axis of the coil spring and a kingpin shaft cross each other in a vehicle standard state where a rudder angle provides a neutral rudder position and a vehicle is stopped, and a reaction force line of the coil spring and the kingpin shaft are in a twisted state at the time of bound and rebound.

The above-object of the present invention is achieved by a strut suspension, including:

a coil spring;

wherein a coil center axis of the coil spring and a kingpin shaft cross each other in a vehicle standard state where a rudder angle provides a neutral rudder position and a vehicle is stopped, and a reaction force line of the coil spring and the kingpin shaft are in a twisted state at the time of steering.

According to the above-mentioned invention, it is possible to generate a moment around the kingpin shaft in a designated state while the primary factor causing automobile deflection is negated.

Other objects, features, and advantages of the present invention will become more apparent from the following detailed description when read in conjunction with the accompanying drawings.

DETAILED DESCRIPTION OF THE PREFERRED EMBODIMENTS

A description is given below, with reference to FIG. 1 through FIG. 9, of embodiments of the present invention.

The present invention can be applied to a MacPherson strut suspension, namely a suspension including a shock absorber used as a part of a suspension link and a transverse link.

Figure 1:
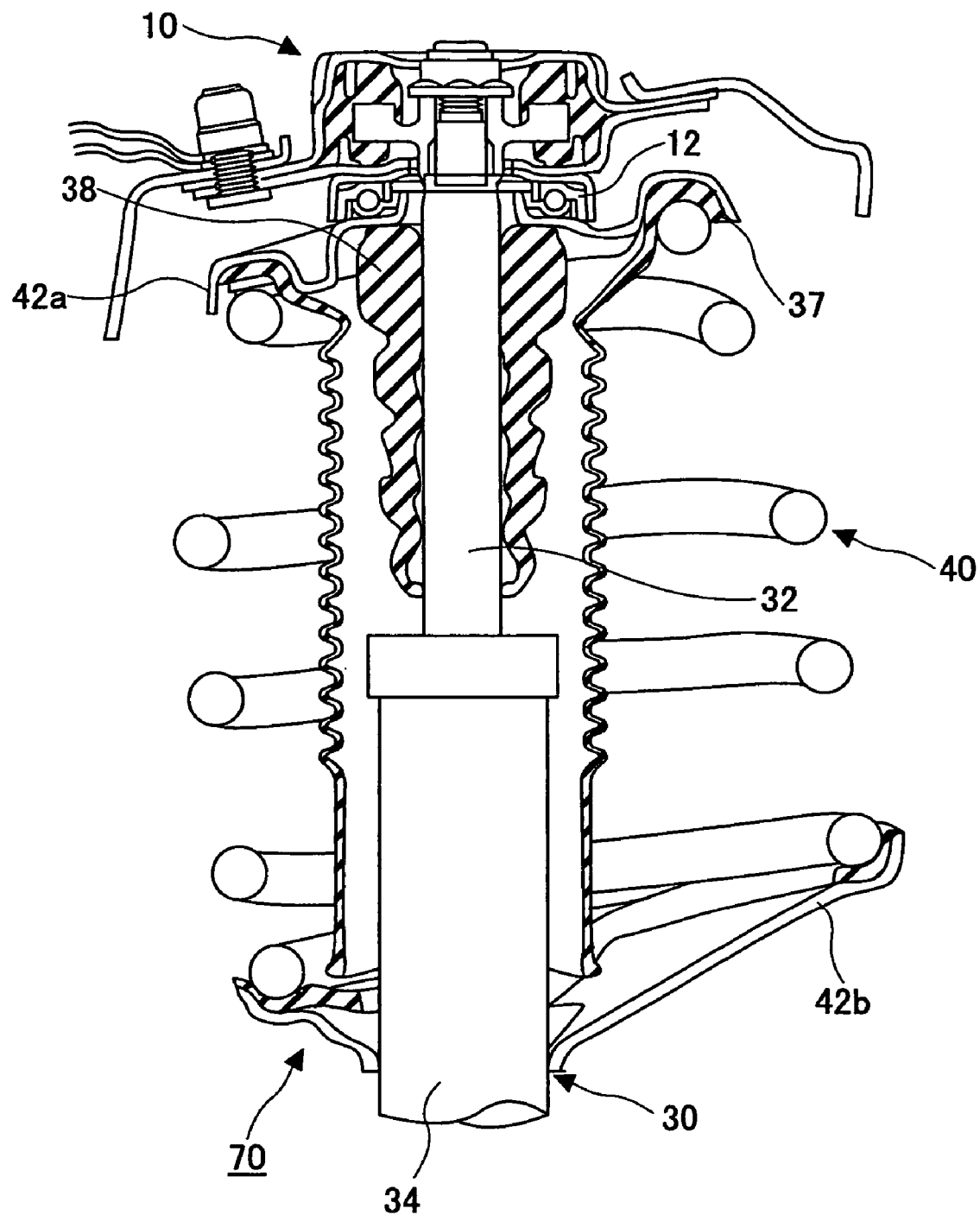
FIG. 1 is a cross-sectional view showing a fundamental structure of a strut suspension.

FIG. 1 is a cross-sectional view showing a fundamental structure of a strut suspension. An upper support 10 is provided at a suspension tower in an engine compartment. The upper support 10 supports an upper side of a strut suspension assembly 70 functioning as a suspension of a wheel. An upper end part of a piston rod 32 of a shock absorber 30 is supported by the upper support 10 via a rubber insert. A wheel (not illustrated) is connected to a lower end of a piston cylinder 34 of the shock absorber 30 via a knuckle (not illustrated).

An upper spring seat 42a is rotatably supported at a lower side of the upper support 10 via a bearing 12. A lower spring seat 42b is fixed to the piston cylinder 34 of the shock absorber 30. A coil spring 40 is arranged between the upper and lower spring seats so as to surround the shock absorber 30. The coil spring may have a structure where an upper end diameter is the same as a lower end diameter, may be a so-called big tail type wherein the upper end diameter is different from the lower end diameter, or may be a barrel-shaped type wherein an intermediate part of the spring is expanded. As is well known, the shock absorber 30 supports a load in upper and lower directions as a part of a link and attenuates spring elasticity of the coil spring 40 at the time of upper and lower movement (bound and rebound, respectively) of the wheel. The upper support 10 is an input separating type whereby only a force of the shock absorber 30 is received while a reaction force (spring force) of the coil spring 40 is directly received by an automobile body.

The strut assembly 70 may have other normal component. For example, in the example shown in FIG. 1, a dust boot integral type upper insulator 37 is provided at an external periphery part of the shock absorber 30. A bound stopper 38 for limiting the movement in upper and lower directions of the piston cylinder 34 is provided at the piston rod 32 of the shock absorber 30.

In the above-discussed strut type suspension, at the times of bound and rebound, the upper and lower spring seats 42a and 42b relatively come close to and separate from each other along an expansion and contraction shaft, that is an absorber shaft or a strut shaft (hereinafter "strut shaft"), of the shock absorber 30. Furthermore, while the wheel is steered around the kingpin shaft (hereinafter "KP shaft") when a steering wheel is operated, the upper spring seat 42a is rotated around a rotational shaft (bearing shaft) of the bearing 12. The lower spring seat 42b is rotated around the KP shaft.

FIRST EMBODIMENT

Figure 2:
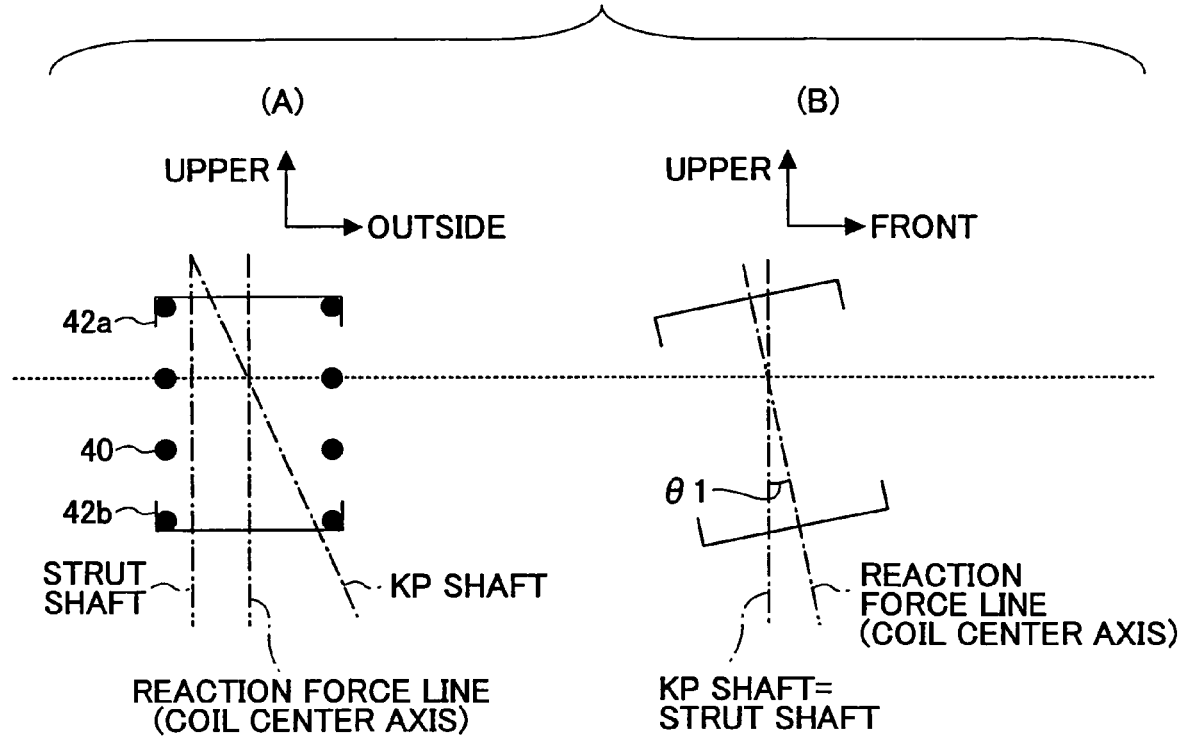
FIG. 2 provides rear and side views of a first embodiment of the strut suspension of the present invention.
Figure 3:
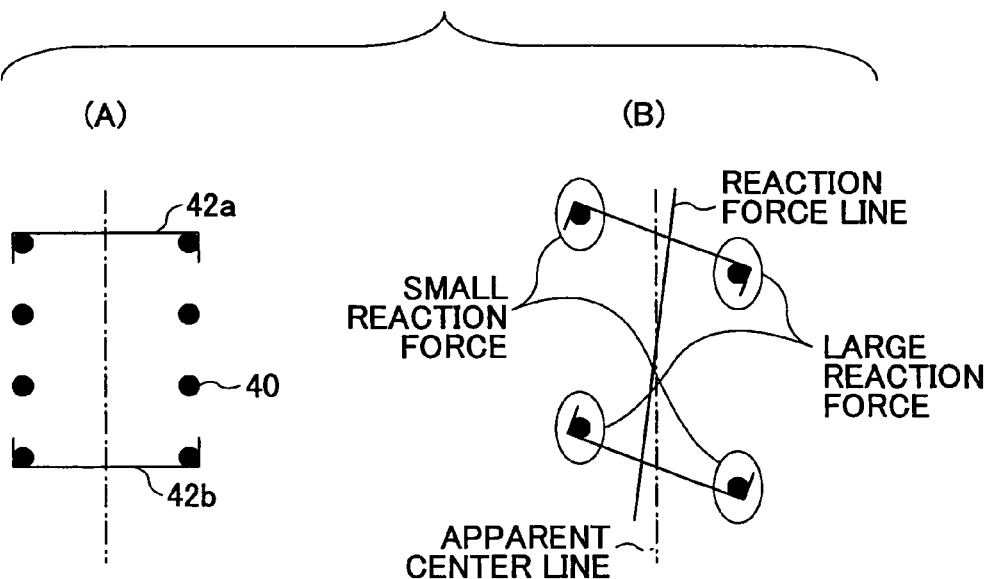
FIG. 3 is a view of a principle of a moving way of a coil reaction force line of the first embodiment of the present invention.
Figure 4:
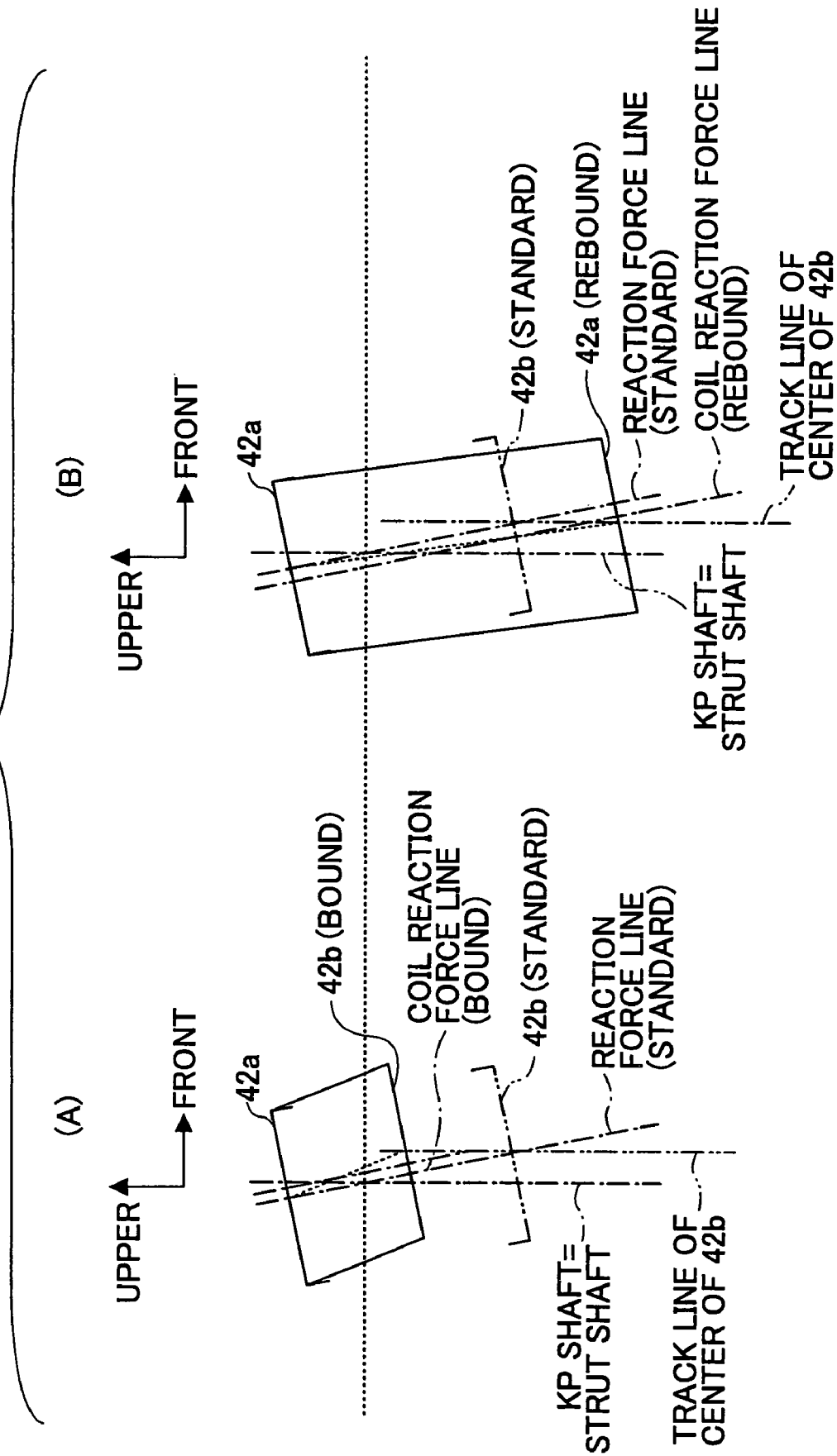
FIG. 4 provides rear view showing a relationship between the coil reaction force line and the kingpin shaft at the time of bound/rebound.

Referring to FIG. 2 through FIG. 4, a specific structure of a strut suspension of the present invention is discussed. In FIG. 2 through FIG. 4, for the convenience of easily understanding the present invention, respective structural elements of the strut suspension are simplified by indicating numerical references.

FIG. 2-(A) is a rear view of the first embodiment of the strut suspension of the present invention wherein the right wheel side is seen from the rear view of the vehicle. The left side of FIG. 2-(A) represents a front side of the vehicle. FIG. 2-(B) is a side view of the first embodiment of the strut suspension of the present invention.

In the strut suspension of this embodiment, as shown in FIG. 2, the coil center axis of the coil spring 40 and the KP shaft cross each other. The coil center axis of the coil spring 40 and the strut shaft form an angle $\theta 1$ larger than zero when being seen at the vehicle side view.

That is, the coil center axis of the coil spring 40 and the KP shaft have a crossing point at the same height in FIG. 2-(A) and FIG. 2-(B). In addition, the coil center axis of the coil spring 40 is inclined at the angle $\theta 1$ against the strut shaft when being seen at the vehicle side view. Although the strut shaft is consistent (coincident) with the KP shaft in the example shown in FIG. 2(B) when being seen at the vehicle side view, it is not necessary for them to be consistent with each other.

In this specification and claims below, as long as there is no other clear indication, the relationship of respective shafts occurs in a vehicle standard state, namely a vehicle stopping state wherein a rudder angle provides a neutral rudder position. Therefore, in the strut suspension of this embodiment, since the coil center axis and the KP shaft cross each other in the vehicle standard state, a moment is not generated around the KP shaft in the vehicle standard state, unlikely when the coil center axis and the KP shaft are in a twisted state.

Meanwhile, in a general strut suspension, since the coil center axis is parallel with the strut shaft, a state where a reaction force line generated by the coil spring 40 is consistent with the coil center axis is maintained even at the time of expansion and contraction of the coil spring 40. Therefore, in such a general strut suspension, the relationship between the coil reaction force line and the KP shaft at the time of bound/rebound is not changed, so that a moment is not generated around the KP shaft.

On the other hand, in the strut suspension of this embodiment, since the coil reaction force line and the KP shaft cross each other in the vehicle standard state as described above, a moment is not generated around the KP shaft. Furthermore, since the coil center axis of the coil spring 40 is inclined against the strut shaft when being seen at the vehicle side view, the relationship between the coil reaction force line and the KP shaft is changed at the time of bound/rebound, so that the coil reaction force line and the KP shaft are in the twisted state.

Therefore, according to this embodiment, since a moment is not generated around the KP shaft in the vehicle standard state, a difference of the moments between right and left sides that causes change(deflection) of the vehicle is prevented from being generated. In addition, since a moment is generated around the KP shaft in the bound/rebound state, it is possible to improve the traveling capability of the vehicle by the action of the moment. The principle of this is discussed below.

A coil reaction force line in a state where upper and lower spring seats 42a and 42b are at angles changed in the same direction is shown in FIG. 3-(B), while the vehicle standard state is shown in FIG. 3-(A).

As shown in FIG. 3-(B), if the upper and lower spring seats 42a and 42b are at angles changed in the same direction, the coil reaction force line (solid line) rotates toward the larger reaction forces against an apparent center line (dotted line), namely where the distance along the center line between the upper and lower spring seats is smaller. That is, the coil reaction force is inclined in the same direction as the angle-change direction of the spring seats 42a and 42b against the apparent center line. This embodiment is based on the above-discussed principle.

In this embodiment, as shown in FIG. 4-(A) (side view of a right wheel, corresponding to FIG. 2-(B)), the lower spring seat 42b moves to upward along the strut shaft at the time of bound (the lower spring seat 42b in the vehicle standard state is indicated by a two dotted line) so that the apparent center line (dotted line) is inclined against the coil center shaft (vehicle standard state). That is, the relationship between the upper and lower spring seats 42a and 42b becomes as shown in FIG. 3-(B). Therefore, the coil reaction force (solid line) is formed rotated toward the larger reaction forces against the apparent center line (dotted line). That is, in this embodiment, as shown in FIG. 4-(A), the coil center axis is inclined against the strut shaft in a direction where an upper side of the vehicle is lower toward the rear side of the vehicle, namely the counter-clockwise direction. The coil reaction force line at the time of bound is offset to the front side of the vehicle more than the KP shaft. In this case, a moment is generated around the KP shaft in a toe-in direction at the time-of bound.

At the time of rebound, as shown in FIG. 4-(B), the lower spring seat 42b (two dotted lines indicate the vehicle standard state) moves downward along the strut shaft. The apparent center line (dotted line) is inclined against the coil center axis (standard state). In this case, since the center line is rotated toward a side different from the side at the time of bound, the upper and lower spring seats 42a and 42b are inclined in a direction opposite to the inclination direction shown in FIG. 3-(B). Therefore, the coil reaction force line (solid line) is formed at a side where the reaction force is larger against the apparent center line (dotted line). That is, in this embodiment, as shown in FIG. 4-(B), the coil center axis of the coil spring 40 is inclined at the angle θ1 in the counter-clockwise direction against the strut shaft when being seen at the vehicle side view, the coil reaction force at the time of rebound is offset to the vehicle rear side more than the KP shaft. In this case, a moment is generated around the KP shaft in the toe-out direction at the time of rebound.

Thus, according to this embodiment, since a desired moment can be generated around the KP shaft at the times of bound/rebound, the difference of the moments between right and left sides that causes the change (deflection) of the vehicle in a normal translational movement is prevented from being generated. Furthermore, in this embodiment, the coil center axis of the coil spring 40 is inclined in the counter-clockwise direction against the strut shaft (KP shaft) when being seen at the vehicle side view, so that a moment in the toe-out direction at the time of rebound and a moment in the toe-in direction at the time of bound are generated around the KP shaft. Thus, it is possible to prevent a moment generated around the KP shaft as an attenuation moment in a state where a roll of the vehicle is generated at the time of steering, for example, and the suspension is stroked. Because of this, it is possible to achieve an attenuation effect around the KP shaft so that stability in high speed steering of a traveling vehicle is improved.

In a case where a under-steer capability or stability in low speed steering is more important than the stability in the high speed steering by the attenuation moment, the coil center axis of the coil spring 40 is inclined in the opposite direction against the strut shaft (KP shaft), that is the coil center axis of the coil spring 40 is inclined at the angle θ1 in the clockwise direction against the strut shaft so that the vehicle upper side is inclined to the vehicle front side when being seen at the vehicle side view, so that the moment in the toe-in direction at the time of rebound and the moment in the toe-out direction at the time of bound can be generated around the KP shaft.

SECOND EMBODIMENT

Figure 5:
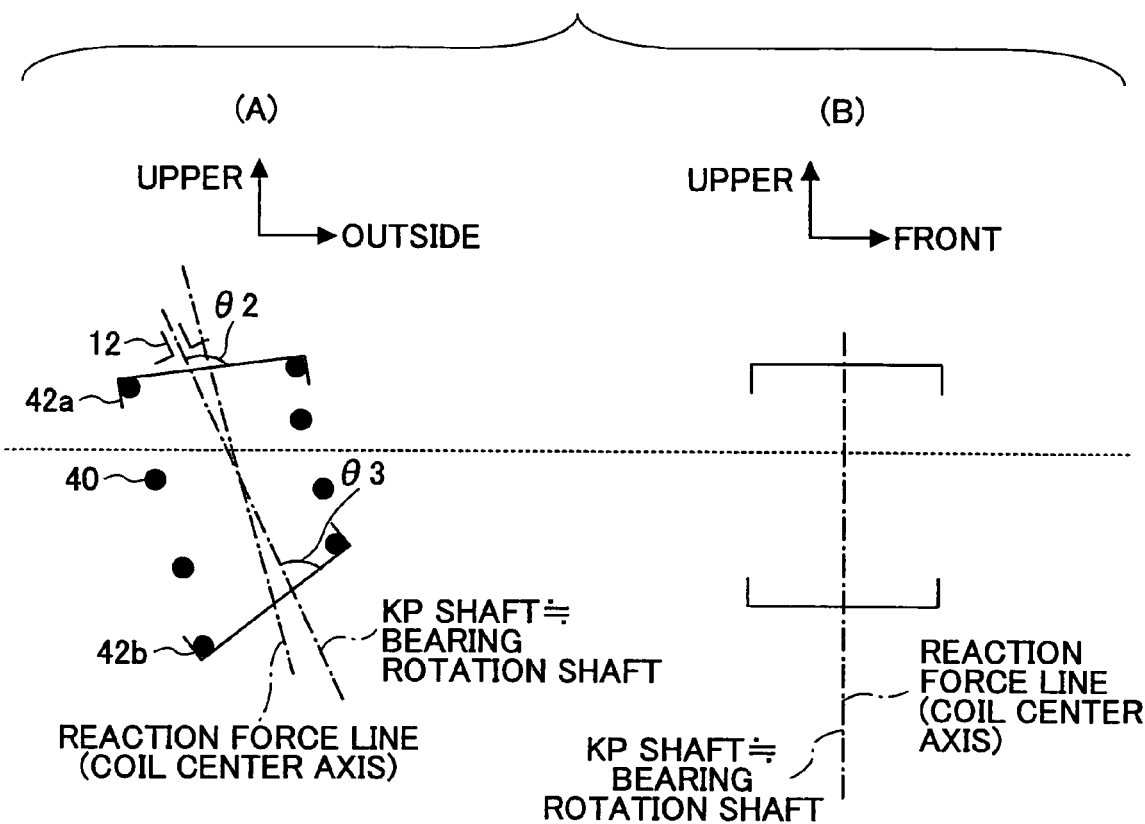
FIG. 5 provides rear and side views of a second embodiment of the strut suspension of the present invention.

FIG. 5-(A) is a rear view of the second embodiment of the strut suspension of the present invention wherein a right wheel side is seen from the rear side of the vehicle. A left side of FIG. 5-(A) represents the front side of the vehicle. FIG. 5-(B) is a side view of the second embodiment of the strut suspension of the present invention.

In the strut suspension of this embodiment, as shown in FIG. 5, the coil center axis and the KP shaft cross each other in the vehicle standard state. Therefore, as well as in the first embodiment, since a moment is not generated around the KP shaft in the vehicle standard state, the difference of the moment between right and left sides that causes the change (deflection) of the vehicle in a normal translational movement can be prevented.

In the strut suspension of this embodiment, the bearing rotation axis is inclined at a non-right angle θ2 against the bearing surface of the upper spring seat 42a when being seen at the vehicle side view, and the KP shaft is inclined at a non-right angle θ3 against the bearing surface of the lower spring seat 42b when being seen at the vehicle side view. The inclination directions are opposite to each other. In order words, in the strut suspension of this embodiment, the bearing surface of the coil spring 40 at a side of the upper spring seat 42a is inclined at a non-right angle θ2 against the bearing rotation axis when being seen at the vehicle rear view, and the bearing surface of the lower spring seat 42b is inclined at a non-right angle θ3 against the KP shaft when being seen at the vehicle rear view. The inclination directions are opposite to each other. Although the KP shaft is consistent with the bearing rotation shaft in the example shown in FIG. 5 when being seen at the vehicle side view, it is not necessary for them to be consistent with each other.

Meanwhile, in a general strut suspension, since the bearing rotation shaft is set to be perpendicular to the bearing surface of the upper spring seat 42a and the KP shaft is set to be perpendicular to the bearing surface of the lower spring seat 42b, a state where a reaction force line generated by the coil spring 40 is consistent with the coil center axis is maintained even at the time of steering. Therefore, in such a general strut suspension, the relationship between the coil reaction force line and the KP shaft at the time of steering is not changed and therefore a moment around the KP shaft is not generated.

On the other hand, in the strut suspension of this embodiment, since the coil reaction force line and the KP shaft cross each other in the vehicle standard state as described above, a moment is not generated around the KP shaft. Furthermore, since the upper and lower spring seats 42a and 42b have the above-discussed bearing surface inclinations, the relationship between the coil reaction force line and the KP shaft is changed at the time of steering, so that the coil reaction force line and the KP shaft are in the twisted state. Therefore, according to this embodiment, since a moment is generated around the KP shaft in the steering state, it is possible to improve the traveling capability of the vehicle by the action of the moment. The principle of this is discussed below.

Figure 6:
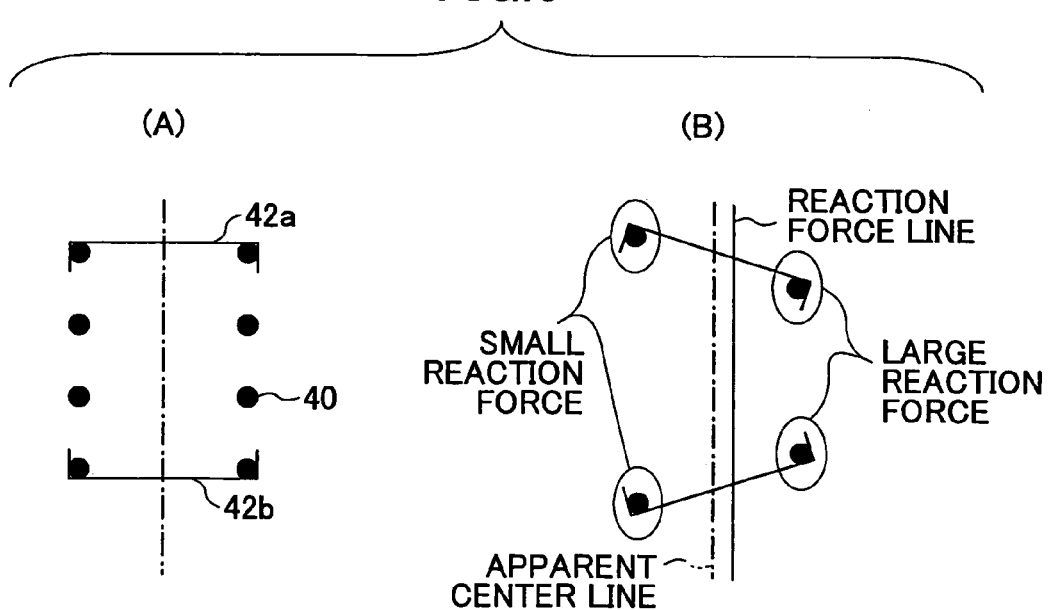
FIG. 6 provides views of a principle of a moving way of a coil reaction force line of the second embodiment of the present invention.

A coil reaction force line in a state where upper and lower spring seats 42a and 42b have angles θ2 and θ3, respectively, changed in the same direction is shown in FIG. 6-(B), while the vehicle standard state is shown in FIG. 6-(A).

As shown in FIG. 6-(B), if the upper and lower spring seats 42a and 42b have angles changed in different direction, the coil reaction force line (solid line) moves to a side where the reaction forces are larger against an apparent center line (dotted line), namely the side where the distance along the center line between the upper and lower spring seats is smaller. That is, the coil reaction force is offset to a side where the spring seats 42a and 42b close against the apparent center line. This embodiment is based on the above-discussed principle.

Figure 7:
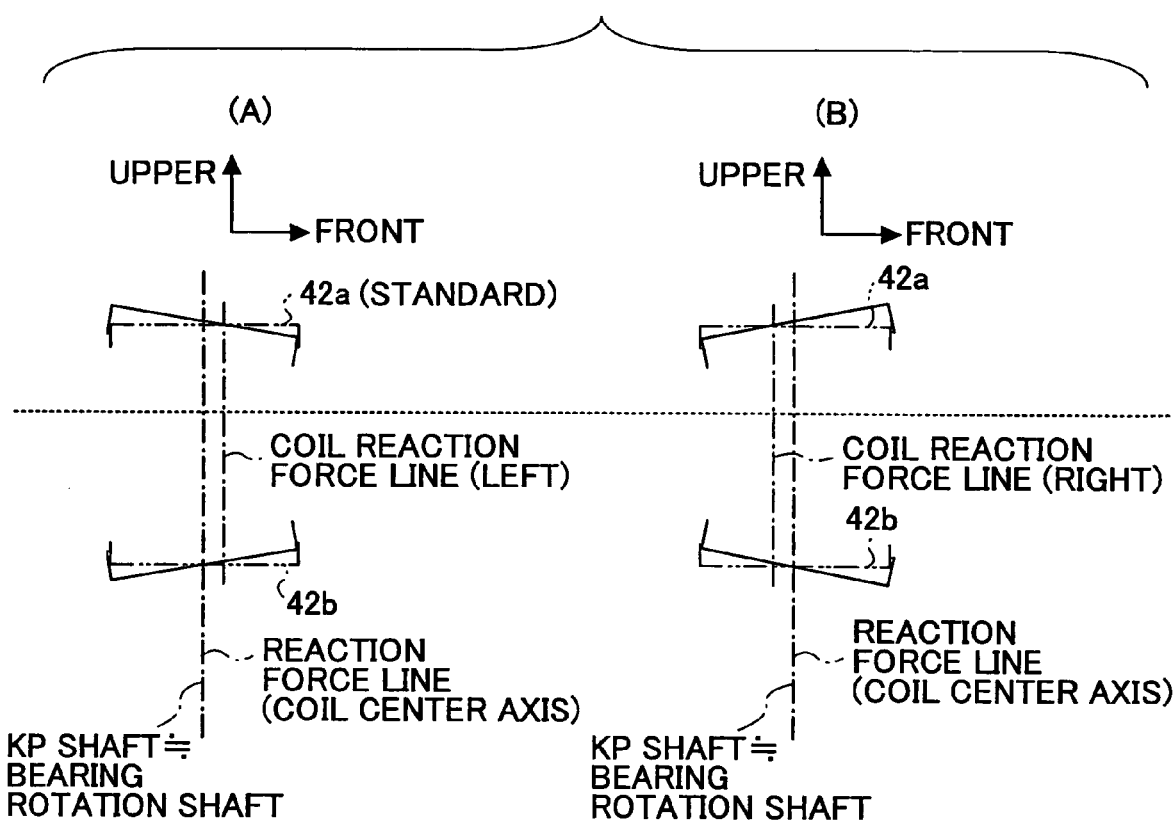
FIG. 7 provides rear view showing relationship between the coil reaction force line and the kingpin shaft at the time of steering (turning a wheel rightward/leftward)

In this embodiment, as shown in FIG. 7-(A) (side view of a right wheel, corresponding to FIG. 5-(B)), in a case of turning the wheel leftward, the upper and lower spring seats 42a and 42b have angles changed so as to be closer to each other at the vehicle front side so that the coil reaction force line (solid line) is offset to the vehicle front side more than the KP shaft. Because of this, a moment is generated around the KP shaft in the toe-in direction.

At the time of turning the wheel rightward, as shown in FIG. 7-(B), the upper and lower spring seats 42a and 42b (two dotted lines indicate a vehicle standard state) have angles changed so as to be closer to each other at the vehicle rear side so that the coil reaction force line (solid line) is offset to the vehicle rear side more than the KP shaft. Because of this, a moment is generated around the KP shaft in the toe-out direction.

Thus, according to this embodiment, since a desired moment can be generated around the KP shaft at only the time of turning the wheel leftward/rightward, the difference of the moments between right and left sides that causes the change (deflection) of the vehicle in a normal translational movement is prevented from being generated. Furthermore, in this embodiment, the bearing surface of the upper spring seat 42a is inclined in a clockwise direction against the bearing rotation shaft when being seen at the vehicle rear view and the bearing surface of the lower spring seat 42b is inclined in a counter-clockwise direction against the bearing rotation shaft when being seen at the vehicle rear view, so that a moment in the toe-out direction at the time of turning the wheel rightward and a moment in the toe-in direction at the time of turning the wheel leftward are generated around the KP shaft. Thus, it is possible to prevent a moment generated around the KP shaft at the time of steering from being an attenuation moment. Because of this, it is possible to achieve an attenuation effect around the KP shaft so that stability in a high speed steering of a traveling vehicle is improved.

In a case where a under-steer capability or stability in low speed steering is more important than the stability in the high speed steering provided by the attenuation moment, the bearing surface of the upper spring seat 42a is inclined against the bearing rotation shaft in the counter-clockwise direction when being seen at the vehicle rear view and the bearing surface of the lower spring seat 42b is inclined against the KP shaft in the clockwise direction when being seen at the vehicle rear view, so that a moment in the toe-in direction at the time of turning the wheel rightward and a moment in the toe-out direction at the time of turning the wheel leftward can be generated around the KP shaft.

The present invention is not limited to these embodiments, but variations and modifications may be made without departing from the scope of the present invention.

In the above-mentioned second embodiment, the bearing surface of the upper spring seat 42a is inclined against the bearing rotation shaft in the clockwise direction when being seen at the vehicle rear view and the bearing surface of the lower spring seat 42b is inclined against the KP shaft in the counter-clockwise direction when being seen at the vehicle rear view. The bearing surface of the upper spring seat 42a may be inclined against the bearing rotation shaft in the counter-clockwise direction when being seen at the vehicle rear view and the bearing surface of the lower spring seat 42b may be inclined against the KP shaft in the clockwise direction when being seen at the vehicle rear view.

Figure 8:
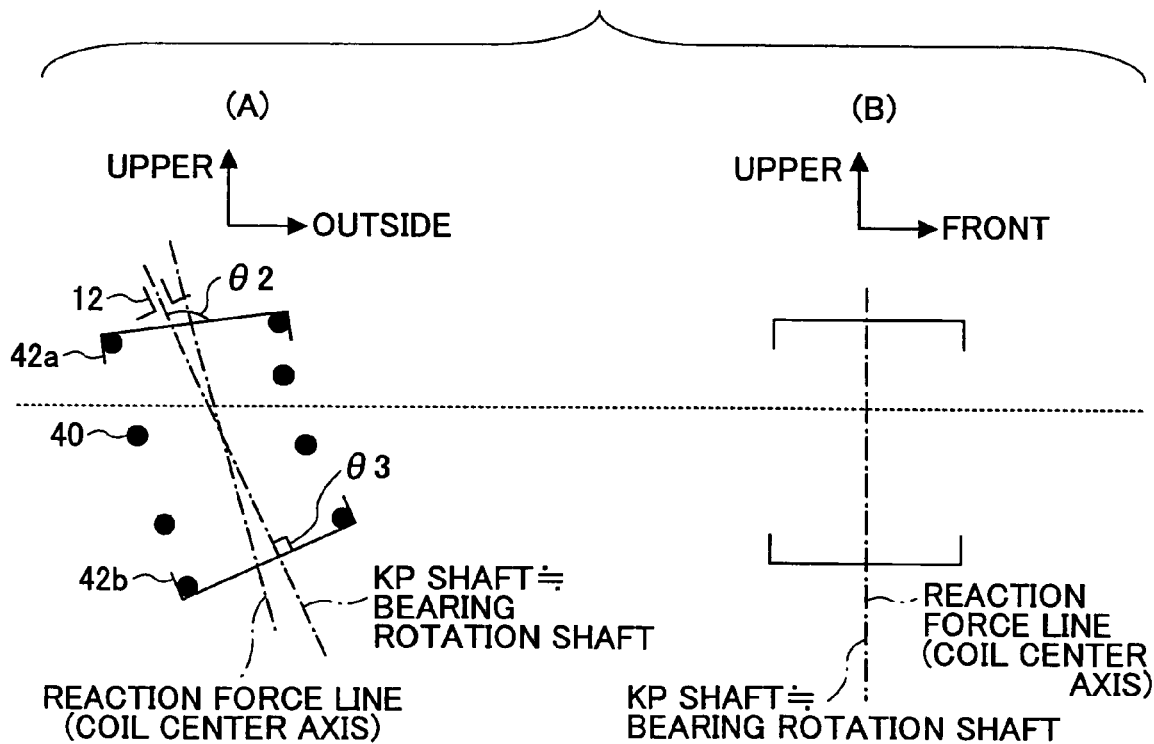
FIG. 8 provides rear and side views of a modified example of the second embodiment of the strut suspension of the present invention.

For example, FIG. 8 shows a modified example where the bearing surface of the upper spring seat 42a is inclined against the bearing rotation shaft in the clockwise direction when being seen at the vehicle rear view and the bearing surface of the upper spring seat 42a is inclined against the KP shaft at right angle (θ3=90 degrees) when being seen at the vehicle rear view.

Figure 9:
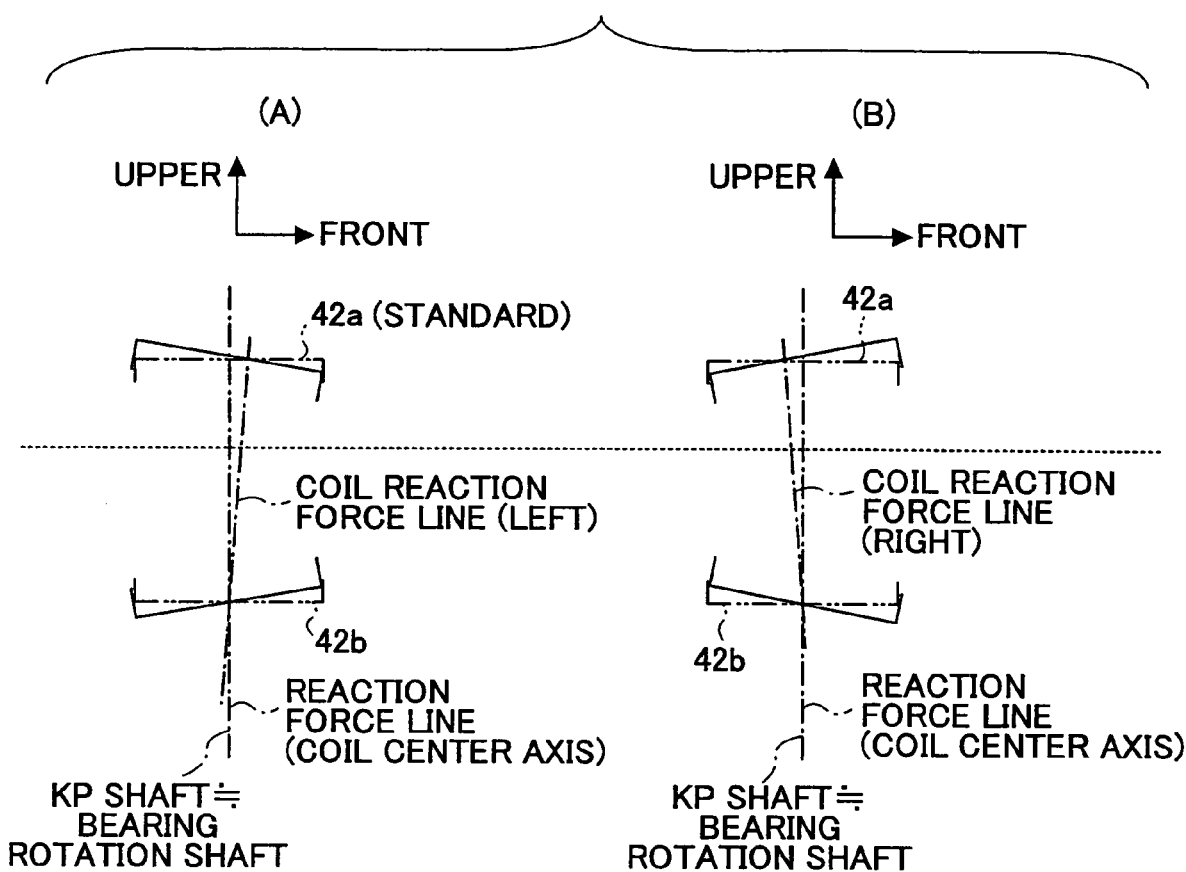
FIG. 9 provides rear views showing a relationship between a coil reaction force line and a kingpin shaft at the time of steering (turning a wheel rightward/leftward) in the modified example shown in FIG. 8.

In this embodiment, as shown in FIG. 9-(A) (side view of a right wheel, corresponding to FIG. 5-(B)), in a case of turning the wheel leftward, the upper spring seat 42a comes closer to the lower spring seat 42b (no change of angle) at the vehicle front side. At this time, following the principle discussed with reference to FIG. 3, since the coil reaction force (solid line) is inclined to the vehicle front side against the KP shaft in a state where a side of the lower spring seat 42b is a base point, the coil reaction force line and the KP shaft are in a twisted state. Therefore, since a moment is generated around the KP shaft in the toe-in direction at the time of turning the wheel leftward even in this modified example, the same effect can be achieved as long as a sufficient moment arm length is obtained.

Similarly, as shown in FIG. 9-(B), in a case of turning the wheel rightward, the upper spring seats 42a comes close to the lower spring seat 42b (no change of angle) at the vehicle rear side. At this time, following the principle discussed with reference to FIG. 3, since the coil reaction force (solid line) is inclined to the vehicle rear side against the KP shaft in a state where a side of the lower spring seat 42b is a base point, the coil reaction force line and the KP shaft are in a twisted state. Therefore, since a moment is generated around the KP shaft in the toe-out direction at the time of turning the wheel rightward even in this modified example, the same effect can be achieved as long as a sufficient moment arm length is obtained.

Only a side of the bearing surface of the lower spring seat 42b may be inclined against the KP shaft in the counter-clockwise direction when being seen at the vehicle rear view. Bearing surfaces of the upper and lower spring seats 42a and 42b may be inclined in the same direction but the degrees of the inclination may be different so that the twisted state can be formed at the time of steering.

This patent application is based on Japanese Priority Patent Application No. 2004-279346 filed on Sep. 27, 2004, the entire contents of which are hereby incorporated by reference.

What is claimed is:

1. A strut suspension, comprising:
a strut whose upper end is supported by an automobile body and whose lower end is supported by a wheel side member;
an upper side spring seat;
a lower side spring seat fixed to the strut, and
a coil spring arranged between the upper side spring seat and the lower side spring seat so as to surround the strut;
wherein, in a vehicle standard state where a rudder angle provides a neutral rudder position and a vehicle is stopped,
a coil spring center axis of the coil spring and a kingpin shaft cross each other, and
the coil spring center axis of the coil spring and a strut shaft form an angle larger than zero when being seen at a vehicle side view, and
wherein, in the vehicle standard state, a moment is not generated about the kingpin shaft, and in a vehicle steering state, a moment is generated about the kingpin shaft.

2. A strut suspension, comprising:
a strut whose upper end is supported by an automobile body and whose lower end is supported by a wheel side member;
an upper side spring seat supported via a bearing so as to rotate against the automobile body;
a lower side spring seat fixed to the strut; and
a coil spring arranged between the upper side spring seat and the lower side spring seat so as to surround the strut;
wherein, in a vehicle standard state where a rudder angle provides a neutral rudder position and a vehicle is stopped,
a coil spring center axis of the coil spring and a kingpin shaft cross each other, and
a bearing rotational shaft is inclined at a non-right angle against a bearing surface of the upper side spring seat or the kingpin shaft is inclined at a non-right angle against a bearing surface of the lower side spring seat, when being seen at a vehicle side view, and
wherein, in the vehicle standard state, a moment is not generated about the kingpin shaft, and in a vehicle steering state, a moment is generated about the kingpin shaft.

3. A strut suspension, comprising:
a strut whose upper end is supported by an automobile body and whose lower end is supported by a wheel side member;
an upper side spring seat supported via a bearing so as to rotate against the automobile body;
a lower side spring seat fixed to the strut; and
a coil spring arranged between the upper side spring seat and the lower side spring seat so as to surround the strut;
wherein, in a vehicle standard state where a rudder angle provides a neutral rudder position and a vehicle is stopped,
a coil spring center axis of the coil spring and a kingpin shaft cross each other, and
a bearing rotational shaft is inclined at a non-right angle against a bearing surface of the upper side spring seat and the kingpin shaft is inclined at a non-right angle against a bearing surface of the lower side spring seat, when being seen at a vehicle side view.

4. The strut suspension according to claim 3, wherein a bearing rotational shaft is inclined at an obtuse angle against a bearing surface of the upper side spring seat and the kingpin shaft is inclined at an acute angle against a bearing surface of the lower side spring seat.

5. The strut suspension according to claim 3, wherein, in a vehicle standard state, a moment is not generated about the kingpin shaft, and in a vehicle steering state, a moment is generated about the kingpin shaft.

6. A strut suspension, comprising:
a coil spring;
wherein a coil spring center axis of the coil spring and a kingpin shaft cross each other in a vehicle standard state where a rudder angle provides a neutral rudder position and a vehicle is stopped, and
a reaction force line of the coil spring and the kingpin shaft are in a twisted state at the time of bound and rebound, and
wherein, in the vehicle standard state, a moment is not generated about the kingpin shaft, and during bound and rebound, a moment is generated about the kingpin shaft.

7. A strut suspension, comprising:
a coil spring;
wherein a coil spring center axis of the coil spring and a kingpin shaft cross each other in a vehicle standard state where a rudder angle provides a neutral rudder position and a vehicle is stopped, and
a reaction force line of the coil spring and the kingpin shaft are in a twisted state at the time of steering, and
wherein, in the vehicle standard state, a moment is not generated about the kingpin shaft, and in the vehicle steering state, a moment is generated about the kingpin shaft.

* * * * *